No. 737,650. PATENTED SEPT. 1, 1903.
W. A. McCOLLOUGH.
STUBBLE CUTTER ATTACHMENT FOR CORN HARVESTERS.
APPLICATION FILED OCT. 25, 1901.
NO MODEL.

Witnesses W. A. McCollough, Inventor.

No. 737,650. Patented September 1, 1903.

UNITED STATES PATENT OFFICE.

WILLIAM ARNOLD McCOLLOUGH, OF LAMOILLE, IOWA.

STUBBLE-CUTTER ATTACHMENT FOR CORN-HARVESTERS.

SPECIFICATION forming part of Letters Patent No. 737,650, dated September 1, 1903.

Application filed October 25, 1901. Serial No. 80,011. (No model.)

*To all whom it may concern:*

Be it known that I, WILLIAM ARNOLD MC-COLLOUGH, a citizen of the United States, residing at Lamoille, in the county of Marshall and State of Iowa, have invented a new and useful Cornstalk-Stubble Cutter, of which the following is a specification.

This invention relates to an improved stubble-cutting attachment for corn-harvesting machines; and it has for its object to provide a device of this class which shall be simple and inexpensive and which may be readily applied to a corn-harvester of ordinary construction for the purpose of cutting off the stubble close to the ground in order to clear the field and to hasten the decay of the stubble, thus placing the ground in better condition for future cultivation than when the stubble is left standing.

My invention consists in the improved construction, arrangement, and combination of parts, which will be hereinafter fully described, and particularly pointed out in the claim.

Figure 1:
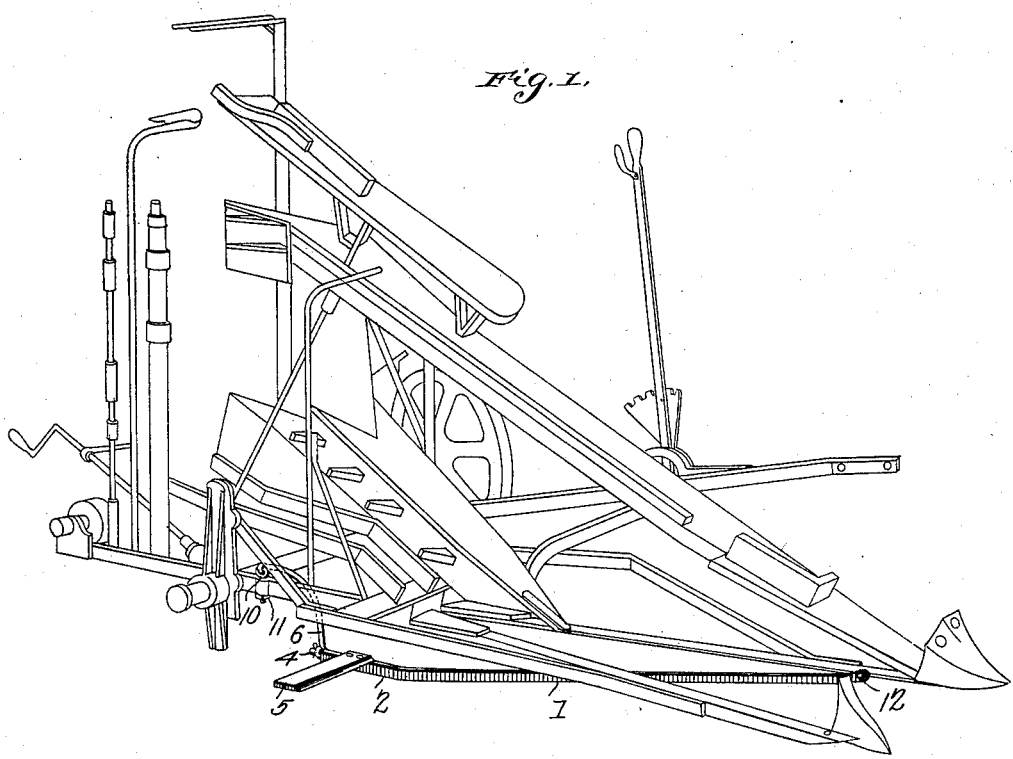
Figure 2:
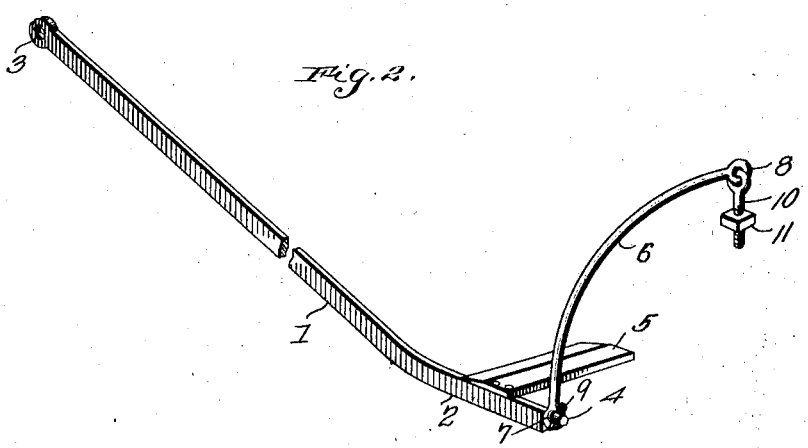

In the accompanying drawings, Figure 1 is a perspective view showing a part of a corn-harvesting machine to which my improved stubble-cutting attachment is applied in operative position. Fig. 2 is a perspective detail view of my improved stubble-cutting attachment.

Corresponding parts in both figures are indicated by like numerals of reference.

1 designates a bar, which I term the "drag-bar," and which has a portion 2, bent at an obtuse angle to the body of the bar 1 and which forms a shoe adapted to ride upon the ground. The drag-bar 1 is provided at its upper forward end with an eye 3, and the shoe 2 has at its rear end a pivotal shank 4.

5 designates a suitably-constructed knife or cutter secured to and extending laterally from the shoe 2. In the drawings bolts have been shown for attaching the knife or cutter to the shoe.

The drag-bar 1, having the shoe 2 and the laterally-extending cutter 5, practically constitutes my improved stubble-cutter; but for the purpose of connecting the same with a corn-harvester I avail myself of a link-rod 6, provided at its ends with eyes 7 and 8, the former of which engages the pivotal shank 4 of the shoe, upon which it may be retained by means of a cotter-pin 9. The eye 8 engages an eyebolt 10, having a nut 11, by means of which it may be connected with the harvester-frame.

In applying my invention to a corn-harvester the drag-bar 1 is connected with the inner side of one of the gatherers by means of a bolt 12, engaging the eye 3, such bolt forming a pivot upon which the drag-bar may freely move. The eyebolt 10 is connected with the frame of the opposite gatherer, the link-rod 6 extending transversely across the space between the gatherers, thus disposing the knife or cutter 5 likewise transversely across the said space and in rear of the ordinary cutting apparatus which is customarily used in machines of this class. When the device is thus mounted, it will be seen that the shoe is free to ride upon the ground, the knife or cutter 5 being held by its own weight and by the weight of the remaining members of the device in a lowered position, so that it will engage the stubble and trim or cut it off close to the ground. The link connection 6 forms a loose joint which permits the device to adjust itself to inequalities in the ground, thus causing the stubble to be trimmed evenly and closely.

My improved device, it will be observed, is of exceedingly simple construction. It may be readily attached for operation to any corn-harvester of ordinary construction, and by trimming or cutting the stubble in the manner described it will assist in preparing the ground for future cultivation.

Having thus described my invention, what I claim is—

A stubble-cutting attachment for corn-harvesters, comprising a drag-bar having an eye at its front end, a shoe having a pivotal shank at its rear end, a cutter mounted upon and extending laterally from the shoe, a link connected pivotally with the shank of the shoe and means for connecting the opposite end of said link and the front end of the drag-bar loosely with the harvester-frame.

WILLIAM ARNOLD McCOLLOUGH.

Witnesses:
LUTHER L. LANE,
JOHN PYLE.